Figures 1, 2:
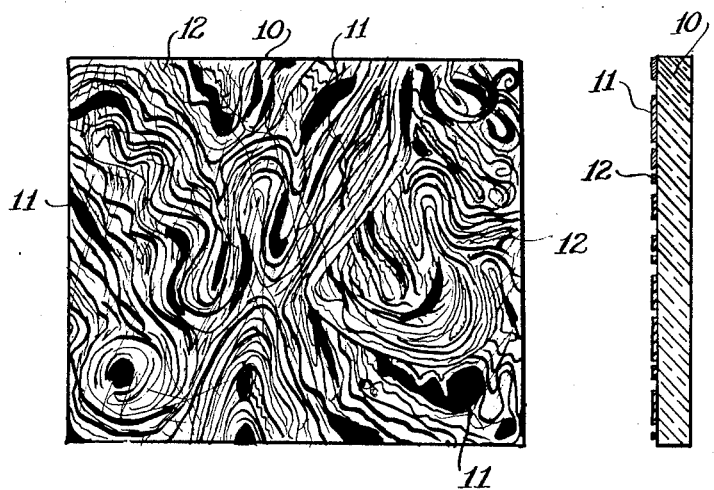

June 12, 1934.　　　　H. A. CLANTON　　　　1,962,480
METHOD OF ORNAMENTING OBJECTS

Filed Nov. 7, 1931

Harry A. Clanton
Inventor

By James S Eaton
Attorney

Patented June 12, 1934

1,962,480

UNITED STATES PATENT OFFICE 1,962,480

METHOD OF ORNAMENTING OBJECTS

Harry A. Clanton, Charlotte, N. C.

Application November 7, 1931, Serial No. 573,723

7 Claims. (Cl. 41—22)

This invention relates to a method of ornamenting glass or other transparent and translucent bodies, the method being carried out on the surface of the object and is usually performed so as to cause the ornamentation to be disposed on the surface farthest removed from the observer, it being especially adaptable for the ornamentation of glass or other transparent vessels by carrying out the method on the interior surface thereof so as to cause the ornamental effect to be visible thru the glass or other object and to be protected by the body to which it is applied.

An object of this invention is to provide an improved method of producing an ornamental coating of paint and similar substances by successively applying small portions of a quick drying paint to the interior of the vessel, hereinafter referred to as a blank while the blank is exposed to a source of heat applied to the exterior of the blank.

Although it is well-nigh impossible to depict the action which takes place, as it differs in each instance, I have shown one form which the paint may take when applied in accordance with my process, in which Figure 1 is an elevation of a piece of glass showing one application of a paint, it being apparent that subsequent applications would form in the portions appearing as white in the drawing.

Figure 2 is a sectional view through Figure 1, and showing the paint formation on the rear surface of the piece of glass, the thickness of the paint being greatly exaggerated for sake of clearness.

In the drawing, the ink portions show the form the paint may assume, and the white portions represent the portion of the surface uncovered after the first application, subsequent applications being employed to cover this surface partially or wholly.

In carrying out the invention, I find that one method of producing a very pleasing and durable ornamental effect on the interior of a blank is to first thoroughly cleanse the interior of the blank, and then apply a small amount of water to the interior surface of the blank such as would be applied by the blank being dipped in a bath of water or by pouring the blank full of water and emptying the same, it being evident that the surface tension of the water will cause a small quantity of the water to remain on the interior surface of the blank.

When the blank is ready for the application of the first ornamental coating there should remain in the blank about a teaspoonful of water, I then drop into the blank and preferably into the water, a small quantity of a quick drying paint, sometimes referred to as enamel and then apply a rotary motion to the blank which causes the water to mix with the paint and to cover the entire interior surface of the blank and I then expose the exterior of the blank to heat and at the same time rotate the blank to partially dry the water from the paint and this causes the surface tension of the coating to act in such a manner as to leave certain portions of the interior of the blank uncovered by the first coating. A quick drying paint is usually composed of pigments and a carrying vehicle and I have found that a quick drying paint in which the pigments are made up of a mixture of about seventy seven per cent aniline color and twenty three per cent of calcium carbonate and with the carrying vehicle being made up of a composition of about five per cent linseed oil, eighty six per cent varnish and nine per cent turpentine, forms a quick drying paint which will act very well in carrying out the method herein disclosed. There are various types of varnishes which comprise the eighty six percent of the carrying vehicle but I have found that the varnish portion of this carrying vehicle which gives best results comprises a mixture of thirty per cent vegetable oil, sixteen per cent resins and fifty four per cent of mineral spirits. Without adding any more water I apply a few drops of a quick drying enamel or paint of a different color from the first application and repeat the rotary movement above described and on account of the first coating being partially dry a co-mingling of the two paints occurs producing a harmonizing of colors and also producing more new colors from the two colors placed in the blank. After the second application, I again submit to the heating operation and repeat the above described operation as many times as desired. I wish to call particular attention to the fact that the breadth of the striations, in other words, the amount of surface covered by the striations are determined by the length of time of exposure to heat between the different applications.

The succeeding applications are carried out in a similar manner as described for the second application and causes a further ornamentation of the uncovered portions of the interior of the blank.

When the desired ornamental effect has been attained, I can then determine the amount of the interior of the surface of the blank which is desired to be left covered by the ornamental effect by the amount of time which the blank is exposed to heat. I find that the longer the blank is exposed to the source of heat after the ornamental effect has been produced, that the narrower the striations or applications of paint become. After the desired ornamental effect has been produced and the size of the striations have been determined by application of heat, I then subject the blank to a drying operation at a temperature approximating that of normal temperature in the sunshine on a summer's day or if desired the drying operation can be performed in an oven, kiln, or the like, with the temperature low enough not to hasten too much the drying operation. The whole drying operation is to be governed by the width desired to be permanently left in the ornamental striations, as it is evident that a quick drying operation will cause the ornamental features to become narrower and smaller, whereas a slow drying operation will cause them to remain approximately in the condition they are when the various applications have been completed.

After the blank with its ornamentations has become perfectly dry there is still an appreciable portion of the interior surface yet uncovered by the ornamental effect depending upon the quantity of paint or other quick drying enamel, which has been applied in the successive operations and also depending upon the number of applications of different colors of paint which have been applied to the blank. I then apply a suitable background of a still differently colored paint or quick drying enamel by brushing, spraying or otherwise to not only cover the ornamental layers which have been applied to certain portions of the interior surface, but also to cover the portions on the interior of the blank which have not been covered by any ornamentation.

I have also found that before applying the background, I can apply a coating of transparent quick drying water-proof varnish to the entire interior of the blank covering not only the ornamental effects but also covering the unornamented portions of the interior surface and then when this coating of water-proof varnish has dried, I then apply the background as above described. I find, in some instances, that the water-proof layer of varnish is more desirable because it prevents any possible intermingling between the ornamental portion of the paint and the background portion.

In carrying out the above described operation, I find that each particular color does not remain segregated entirely to itself but on account of the successive applications of these paints, one being applied before the preceding application has become thoroughly dried, an intermingling of the colors occurs to an appreciable extent, depending upon the state of dryness of the preceding application before the succeeding application, thus causing the colors to harmonize and intermingle with each other, thus producing many more color combinations in the ornamental effect than are represented by the number of different colors of paint applied. I find that this co-mingling or harmonizing of colors has in many instances produced more than twenty times as many colors as are represented by the number of applications of paint.

After the ornamentation has been completed and the background has been applied and allowed to thoroughly dry, I then apply a coating of shellac over the entire background and while this shellac is in an undried condition, I apply a mixture composed of equal parts of fine sand and Portland cement in a dry state to thoroughly cover the coating of shellac as this powdered mixture adheres to the undried shellac. After the shellac, with its coating of powdered composition composed of cement and sand, has dried I then apply to the interior of the blank a coating of crack filler and allow this coating to dry.

I then apply a protective coating to the interior of the blank usually of shellac or any other suitable material. After the final protective coating has been applied, I then allow the ornamented blank to dry either by placing the same in an oven for quick drying or by exposing the same the desired number of hours to atmospheric conditions until all of the applications, above described, have become thoroughly dry.

Figures 1 and 2 show how the paint is disposed over the surface of the glass or other transparent surfaces, as the water and the paint, when exposed to heat applied to the other side of the surface from that which the drops of paint are placed, causes the paint and water to spread out and forms striations 11 which are disposed on the glass 10. Blank spaces are left between the striations and some of these striations 11 are thick and others 12 are thin or hair-like in appearances. After the first coat is applied, of course as many more different colors can be applied and these striations will run criss-cross as to the other striations and fill in the white portions appearing in Figure 1 to complete the ornamentation. As many coats can be applied as desired before the backing up operation takes place.

In the specification, there has been set forth a preferred embodiment of the invention, and although specific terms are employed, they are used in a generic and descriptive sence only and not for purposes of limitation, the scope of the invention being set forth in the appended claims.

I claim:

1. That process of ornamenting a glass container which comprises moistening the interior of the container, then applying successively small quantities of quick drying paint to the moistened surfaces and rotating and tilting the container while applying heat to the exterior of the container.

2. That method of producing a straited ornamented effect on one surface of a transparent article having opposed surfaces which comprises applying water and paint to one surface, applying heat to the other surface and continuing the heat application until striae of the desired contour have been formed on the said one surface.

3. That method of producing a striated effect upon one surface of a translucent article having two surfaces which comprises moistening one surface and applying thereto a small quantity of a quick drying paint, moving the article to cause the moisture and paint to cover at least a portion of said one surface then applying heat to the other surface to cause the paint and moisture to withdraw from a portion of said one surface and to form striations on said one surface, and continuing the heat treatment to narrow said striations to the desired width.

4. That process of decorating the interior surface of a glass container which comprises placing a small quantity of water in the container, then placing in the water a small quantity of a quick drying paint, then rotating the container and at the same time exposing the exterior of the container to a source of heat, then adding a small quantity of quick drying paint of another color and repeating the rotation and heat treating operations, then pouring the surplus paint and water from the container and allowing the ornamented container to dry.

5. That process of producing ornamented striations of paint of varying colors on the interior of a glass container, which comprises moistening the inside surface of the container, then applying a few drops of a quick drying paint to the interior surface, then rotating the container while exposing its outer surface to a source of heat, then applying a few drops of a quick drying paint of another color and repeating the rotating and heating of the container, then drying the paint deposited on the inside surface of the container, then applying a coating of paint over the entire inner surface of the container and then drying the container.

6. That process of decorating one surface of a glass article having opposed surfaces which comprises moistening one surface of the article, then applying a small quantity of quick drying paint to the moistened surface, then moving the article to cause the water and paint to mix with each other and to form a film of water and paint over the moistened surface, when exposing the other surface to a source of heat and continuing the movement of the article, then repeating the paint applying, heating and moving operations with other colors of paint as many times as desired and then drying the decorated article.

7. The process of treating objects having two surfaces to produce an ornamented effect on one of the surfaces visible on the other surface which comprises wetting one surface with water, then applying to the one surface a small quantity of a quick drying paint, then moving the object to cause the water and paint to form a film over said one surface, then exposing the other surface to heat to evaporate some of said water and to cause the remaining water and paint to produce a striated effect on the one surface, continuing the exposure to heat until the striations diminish in breadth to the desired amount, then applying a small quantity of paint of another color and repeating the moving and heating operations as before, then drying the paint, and then applying a coat of paint to the entirety of said one surface, covering the ornamented and unornamented portions of said one surface.

HARRY A. CLANTON.